June 7, 1955     C. C. GATES, JR     2,710,042

METHOD OF MAKING A PNEUMATIC TIRE

Filed Aug. 5, 1950

Inventor
CHARLES C. GATES JR.

By Anderson & Muller
Attorneys

United States Patent Office 2,710,042
Patented June 7, 1955

2,710,042

METHOD OF MAKING A PNEUMATIC TIRE

Charles C. Gates, Jr., Denver, Colo., assignor to The Gates Rubber Company, Denver, Colo., a corporation of Colorado Application August 5, 1950, Serial No. 177,927

1 Claim. (Cl. 154—14)

This invention relates to pneumatic vehicle tires and more particularly to improvements in tread construction and methods of making same.

One of the causes of failure of pneumatic tires, such as those used on automobiles, trucks, and the like, is the development of tread cracks which originate adjacent or in the bottoms of the tread voids and continue to enlarge until they extend into the carcass.

One of the objects of the invention is to provide a tire with improved tread construction which obviates tread cracking.

Another object is to obviate the tread cracking by reinforcing in a novel manner the tread adjacent the voids with a flexible fabric, or the like.

Another object is to provide novel methods of making the reinforced tread.

Further objects, advantages and salient features will become more apparent from a consideration of the description to follow, the appended claims, and the accompanying drawing, in which:

Figure 1:
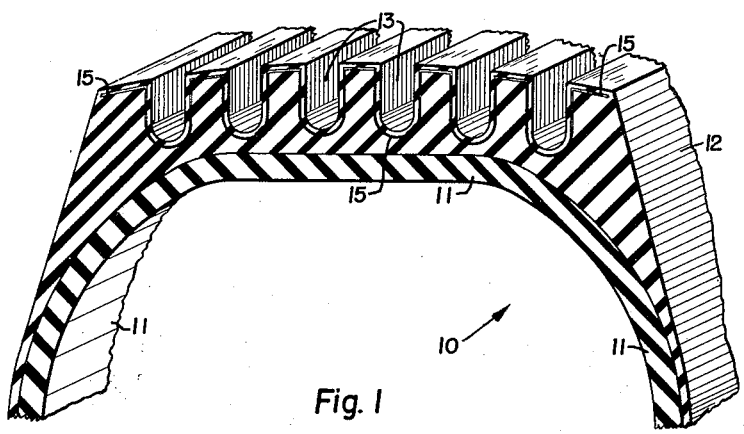
Figure 1 is a fragmentary isometric view of a cured pneumatic tire, a portion being shown in transverse section.

Referring to the drawing, and particularly to Figure 1, a pneumatic tire 10 is illustrated, this having the conventional carcass 11 to which is vulcanized a rubber tread 12, having a plurality of voids 13 in its road engaging surface. The carcass is of any conventional construction, such as crossing layers of cord fabric, bonded together by vulcanization. Details of the carcass have been omitted from the drawing to simplify same, since such details are common and well understood in the art.

Figure 7:
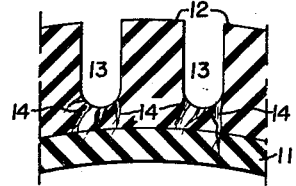
Figure 7 is a section similar to Figures 1 and 3 illustrating a conventional unreinforced tire tread.

Referring to Figure 7, which exemplifies conventional construction, a plurality of cracks 14 are illustrated, these being the cracks previously referred to which originate at the bottoms of the voids 13, enlarge into the lowermost portion of the tread, and finally into the carcass 11, eventually causing tire failure. Even though complete failure may not result, the tire is rendered unfit for recapping. This cracking has been found to be largely, if not entirely, due to concentration of stresses around the bottom of the voids which results from growth of the tire during use.

It has been found that this cracking can be obviated or minimized by reinforcing the tread in a manner to now be described, reference again being made to Figure 1. In this construction a fabric 15 is vulcanized to the tire tread, the fabric having filaments, threads or cords, which extend in a direction transverse to the circumferential axis of the tire and follow around the walls of the voids, preferably slightly below the exposed surfaces thereof so that the fabric is covered with a layer of rubber.

Figure 2:
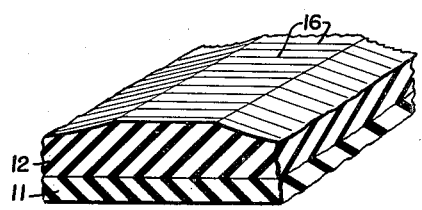
Figure 2 is a view similar to Figure 1 showing a portion of the tire in its uncured state.

The fabric may be in the form of a plurality of synthetic filaments, such as nylon, or threads, yarns or cords of such material or any other suitable material such as cotton or the like suitably treated with a bonding agglutinant. Undrawn nylon has been found especially well adapted for the purpose because of its high stretch characteristics and hence facilitates construction of the tire by conventional methods since the undrawn nylon may be applied to the tread material in its uncured state as shown at 16, Figure 2, and when the tire is placed in the curing mold the embossed portions of the latter, which form the tread voids, will force the reinforcing material into the position shown in Figure 1.

Figure 3:
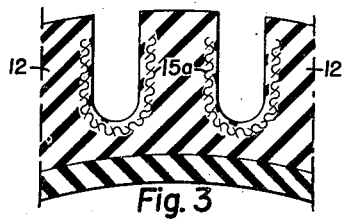
Figure 3 is a section similar to Figure 1 showing a slightly modified form of reinforcing.
Figure 4:
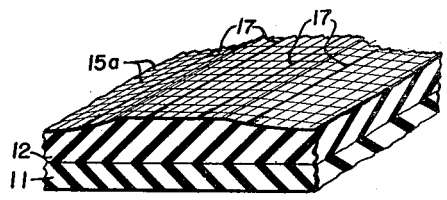
Figure 4 is a view similar to Figure 2 showing a portion of the tire of Figure 3 in its uncured state.

Figure 3 illustrates a tire tread constructed by the method just described but employing a material which does not stretch so readily. In this construction, the reinforcing fabric 15a is disposed on the uncured tire tread material as shown in Figure 4, the fabric being provided with a plurality of slits 17 substantially midway between the voids so that the various circumferentially disposed bands thus formed may move in the tread material to the position shown in Figure 3 when the mold is closed and during flow of the tread material in the mold as the tire is cured.

Alternatively, the material may be disposed around the tire tread, prior to curing, in the form of individual bands, rather than by forming such bands by slitting.

Figure 5:
Figure 5 is a section similar to Figures 2 and 4 showing another modified form of reinforcing.

One form of the foregoing construction is illustrated in Figure 5 wherein the reinforcing material such as a woven fabric, is disposed on the tread material in the form of overlapping strips 15b which are bonded together sufficiently to apply them as a sheet, but will slide relatively when placed in the mold so that they will attain a position, when the tire is cured, substantially as shown in Figure 3.

Figure 6:
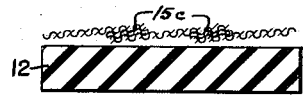
Figure 6 is a section similar to Figure 5 showing another modified form of reinforcing.

Figure 6 illustrates another modified form of the invention wherein the reinforcing material is provided with a plurality of folds 15c which may open when the tire is placed in the mold to permit the requisite change in length to follow the walls of the tire voids.

In addition to fabrics of the type previously described, a linter stock may be employed, linter stock being a plurality of relatively short fibers which are oriented in substantially parallel relation. The linter stock may be applied to the uncured tread with the fibers thereof extending transversely to the circumferential axis of the tire. After curing they will be disposed around the walls of the voids substantially as shown in Figures 1 and 3.

While the tread is illustrated with parallel voids it is to be understood that the voids may have any configuration desired and the voids may be of any cross sectional shape. The terms "fibers" as herein employed in the claims is to be understood as any flexible material such as nylon, rayon, cotton, or the like, the material being in the form of monofils, threads, cords, yarns, woven fabric or other type of fabric. It shall also include material in the form of linter stock wherein the linters thereof are oriented in substantially parallel relation.

Having described the invention, what I claim as new is:

A method of making rubber tires which comprises: disposing uncured tread material on the periphery of a tire carcass, laying a fibrous reinforcing material on the tread material with the fibers disposed transversely to the circumferential axis of the tire, pressing all of said material toward the carcass at various points to form voids in the tread and moving the reinforcing material to positions wherein it extends only around the bottoms of the voids and along the sides thereof and substantially coextensive with the exposed areas of said bottoms of the voids, and curing the tire while the material is in the last named positions to effect a bond between the material and tire tread.

References Cited in the file of this patent

UNITED STATES PATENTS

| | | |
|---|---|---|
| Re. 23,235 | Hawkinson | May 30, 1950 |
| 1,083,231 | Wale | Dec. 30, 1913 |
| 1,083,584 | Blowers | Jan. 6, 1914 |
| 1,141,708 | Hill | June 1, 1915 |
| 2,110,224 | Havens | Mar. 8, 1938 |
| 2,110,225 | Havens | Mar. 8, 1938 |
| 2,479,474 | Crocker | Aug. 16, 1949 |
| 2,513,064 | Solomon | June 27, 1950 |
| 2,542,871 | Johnson | Feb. 20, 1951 |

FOREIGN PATENTS

| | | |
|---|---|---|
| 23,668 | Great Britain | 1907 |